US010856227B2

(12) United States Patent
Liao et al.

(10) Patent No.: US 10,856,227 B2
(45) Date of Patent: Dec. 1, 2020

(54) TRIGGERING ADAPTATION MECHANISMS FOR UE POWER-SAVING

(71) Applicant: Mediatek Inc., Hsin-Chu (TW)

(72) Inventors: Yiju Liao, Hsin-Chu (TW); Wei-De Wu, Hsin-Chu (TW); Chien Hwa Hwang, Hsin-Chu (TW); Cheng-Hsun Li, Hsin-Chu (TW); Chi-Hsuan Hsieh, Hsin-Chu (TW); Xiu-Sheng Li, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/583,476

(22) Filed: Sep. 26, 2019

(65) Prior Publication Data
US 2020/0107266 A1 Apr. 2, 2020

Related U.S. Application Data

(60) Provisional application No. 62/738,050, filed on Sep. 28, 2018, provisional application No. 62/747,718, filed on Oct. 19, 2018, provisional application No. 62/754,687, filed on Nov. 2, 2018, provisional application No. 62/768,192, filed on Nov. 16, 2018.

(51) Int. Cl.
*H04W 52/02* (2009.01)
*H04W 76/28* (2018.01)
(52) U.S. Cl.
CPC ....... *H04W 52/0229* (2013.01); *H04W 76/28* (2018.02)

(58) Field of Classification Search
CPC .. H04B 7/0626; H04B 10/564; H04B 17/327; H04W 52/0229; H04W 52/02; H04W 52/0235; H04W 52/24; H04W 52/241; H04W 76/28
See application file for complete search history.

(56) References Cited

U.S. PATENT DOCUMENTS

2010/0255847 A1 10/2010 Lee et al.
2015/0230179 A1* 8/2015 Gupta ................... H04W 24/04
370/311

(Continued)

FOREIGN PATENT DOCUMENTS

CN 1697341 A 11/2005
CN 103139886 A 6/2013

(Continued)

OTHER PUBLICATIONS

International Serach Report of PCT/CN2019/108388, dated Dec. 27, 2019.

*Primary Examiner* — Andrew Wendell
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE attempts to detect a trigger event. The UE determines values of a first set of power configuration parameters when the trigger event is detected, wherein a change in a value of each power configuration parameter in the first set of power configuration parameters affects power consumption of the first UE. The UE transmits or receives signals in accordance with the values of the first set of power configuration parameters.

40 Claims, 14 Drawing Sheets

(56) References Cited

U.S. PATENT DOCUMENTS

| | | | | |
|---|---|---|---|---|
| 2016/0029309 A1* | 1/2016 | Kim | ................... | H04W 52/0258 |
| | | | | 370/311 |
| 2016/0150490 A1* | 5/2016 | Ouchi | ................... | H04W 52/16 |
| | | | | 455/522 |
| 2019/0059054 A1* | 2/2019 | Lee | ................... | H04L 5/005 |
| 2019/0116012 A1* | 4/2019 | Nam | ................... | H04L 5/0085 |
| 2019/0215136 A1* | 7/2019 | Zhou | ................... | H04B 17/24 |
| 2019/0305783 A1* | 10/2019 | Caffee | ................... | H03B 5/32 |
| 2020/0029292 A1* | 1/2020 | Zou | ................... | H04W 56/0045 |
| 2020/0053656 A1* | 2/2020 | Hosseini | ................... | H04B 7/0632 |
| 2020/0106551 A1* | 4/2020 | Shi | ................... | H04L 5/0055 |

FOREIGN PATENT DOCUMENTS

| | | |
|---|---|---|
| CN | 103391607 A | 11/2013 |
| CN | 108289324 A | 7/2018 |
| CN | 108924920 A | 11/2018 |
| CN | 109429309 A | 3/2019 |
| CN | 109923906 A | 6/2019 |
| CN | 110167173 A | 8/2019 |

\* cited by examiner

TRIGGERING ADAPTATION MECHANISMS FOR UE POWER-SAVING

CROSS-REFERENCE TO RELATED APPLICATION(S)

This application claims the benefits of U.S. Provisional Application Ser. No. 62/738,050, entitled "TRIGGERING ADAPTATION MECHANISMS FOR UE POWER-SAVING" and filed on Sep. 28, 2018; U.S. Provisional Application Ser. No. 62/747,718, entitled "DESIGN ON POWER SAVING SIGNAL" and filed on Oct. 19, 2018; U.S. Provisional Application Ser. No. 62/754,687, entitled "TRIGGERING ADAPTATION FOR UE POWER SAVING" and filed on Nov. 2, 2018; U.S. Provisional Application Ser. No. 62/768,192, entitled "DESIGN ON UE ADAPTATION FOR POWER SAVING" and filed on Nov. 16, 2018; all of which are expressly incorporated by reference herein in their entirety.

BACKGROUND

Field

The present disclosure relates generally to communication systems, and more particularly, to techniques transmitting a power saving signal (PSS) to a UE in a Radio Resource Control (RRC) connected mode.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE attempts to detect a trigger event. The UE determines values of a first set of power configuration parameters when the trigger event is detected, wherein a change in a value of each power configuration parameter in the first set of power configuration parameters affects power consumption of the first UE. The UE transmits or receives signals in accordance with the values of the first set of power configuration parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
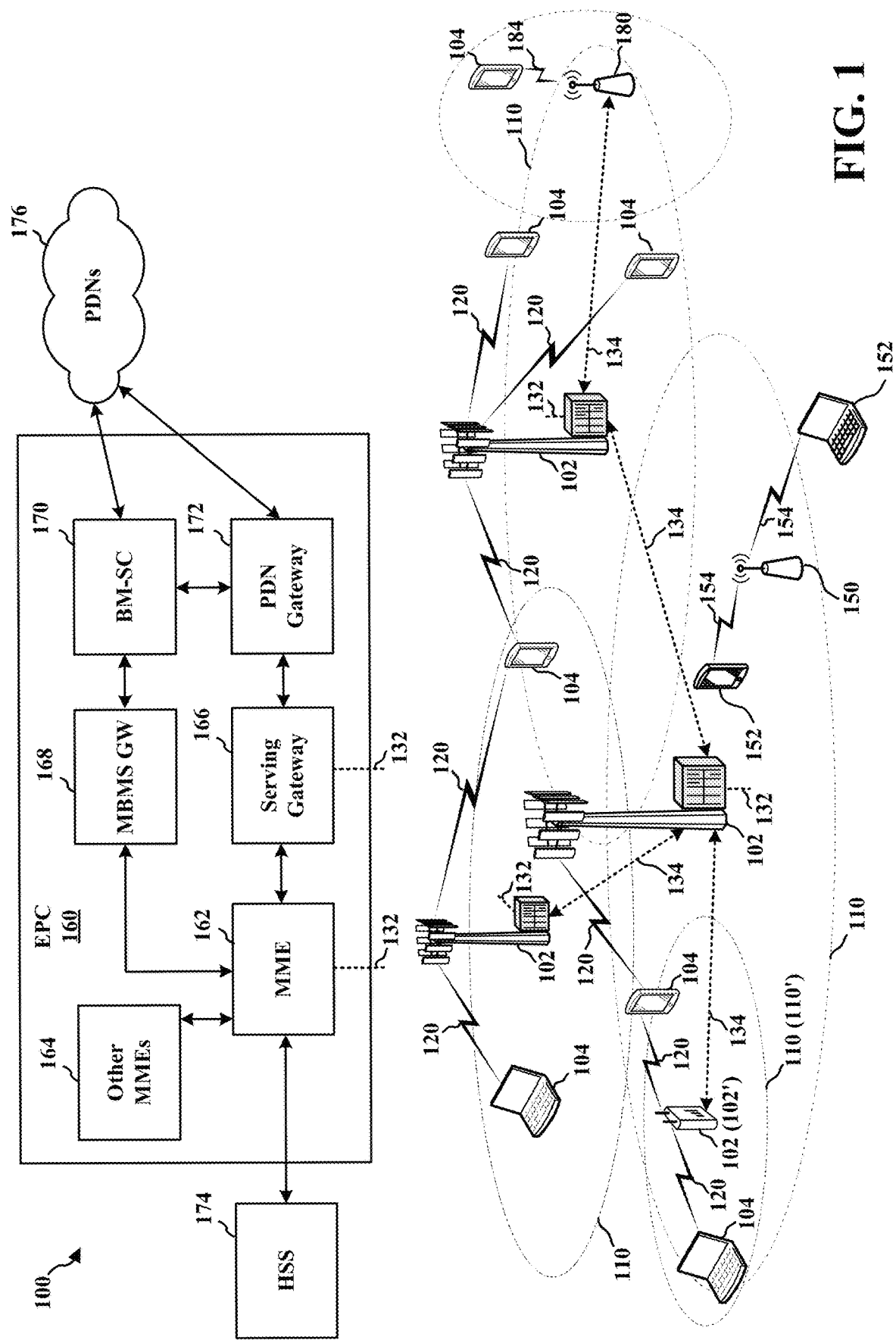
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
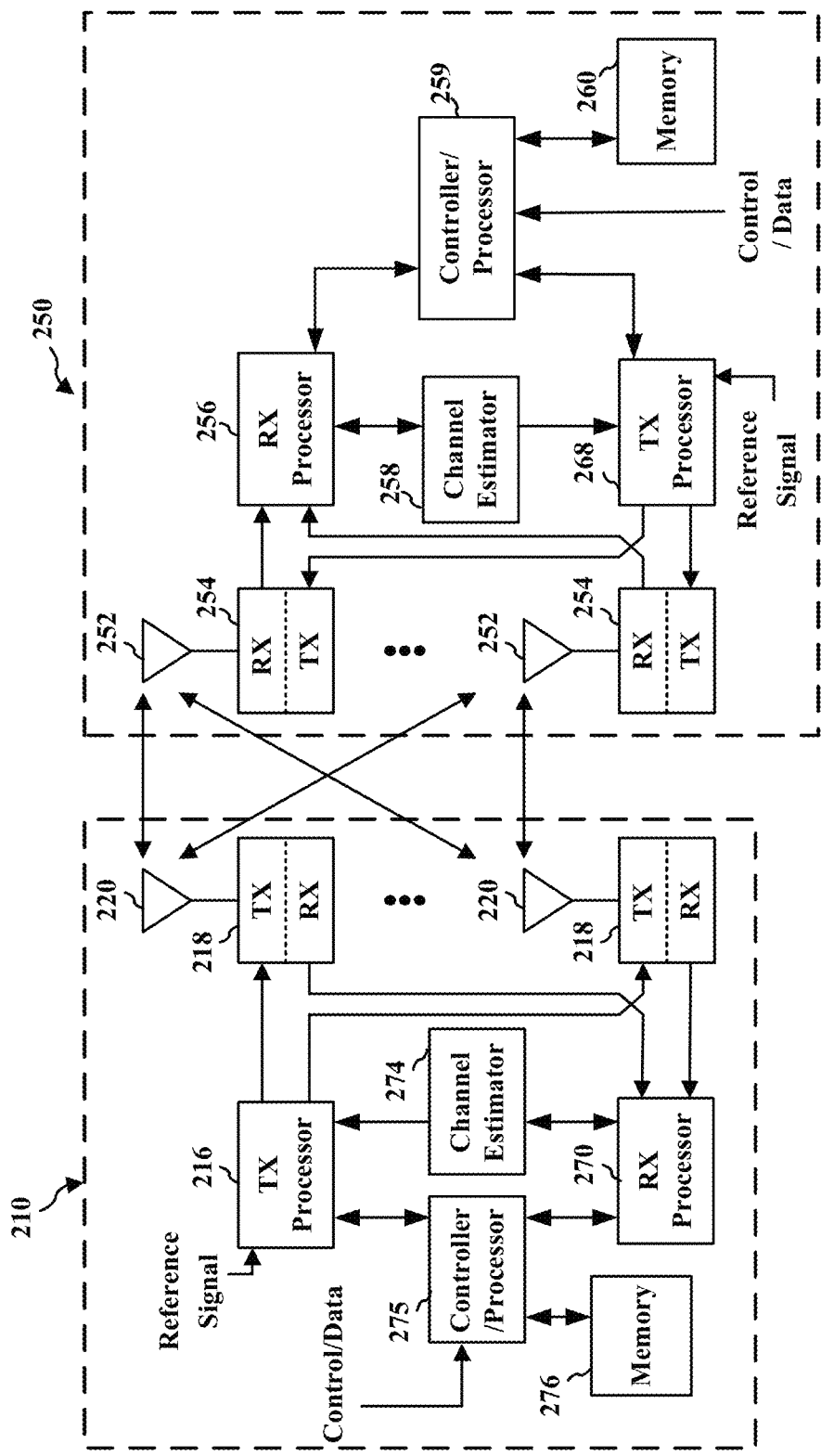
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
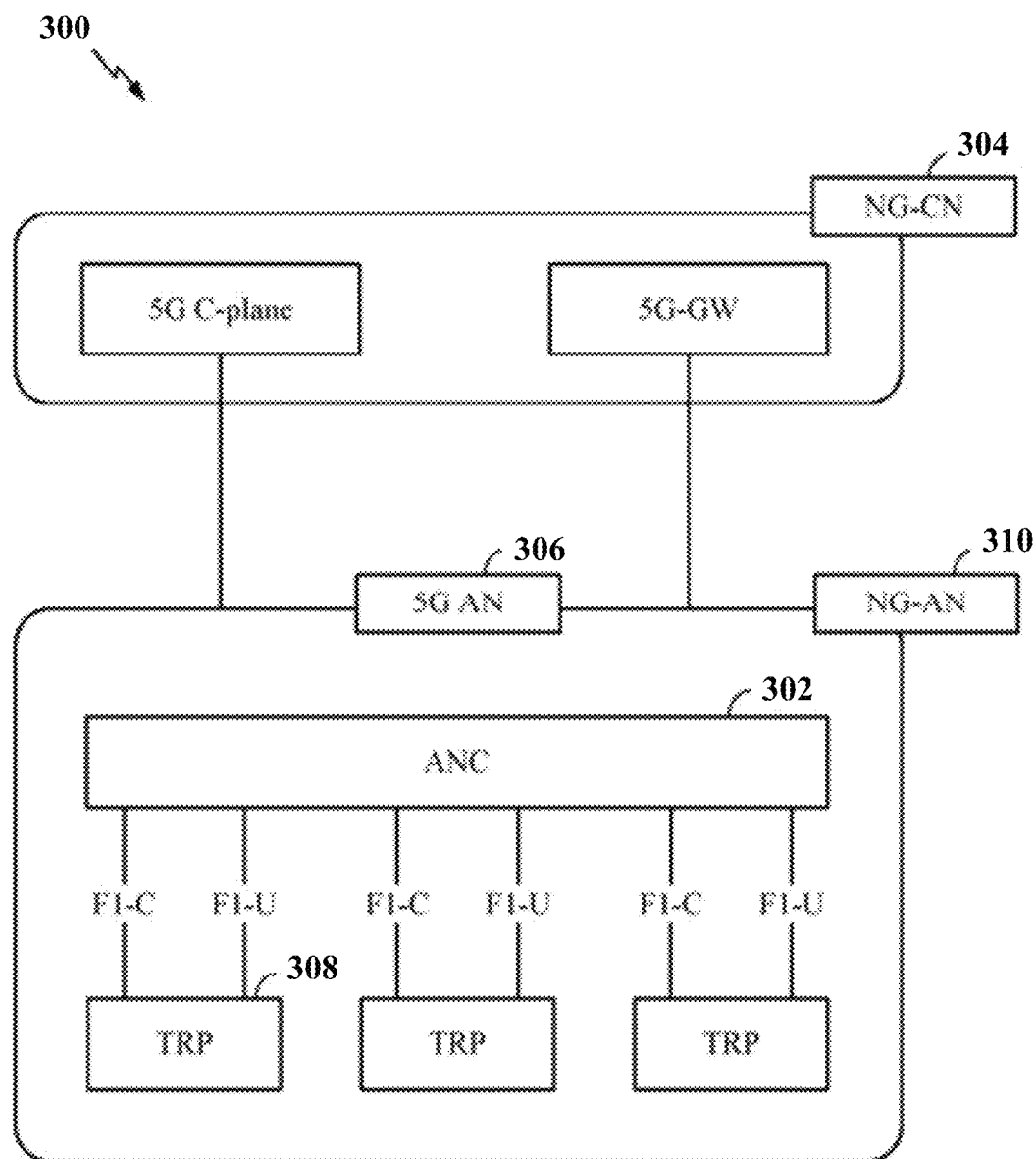
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
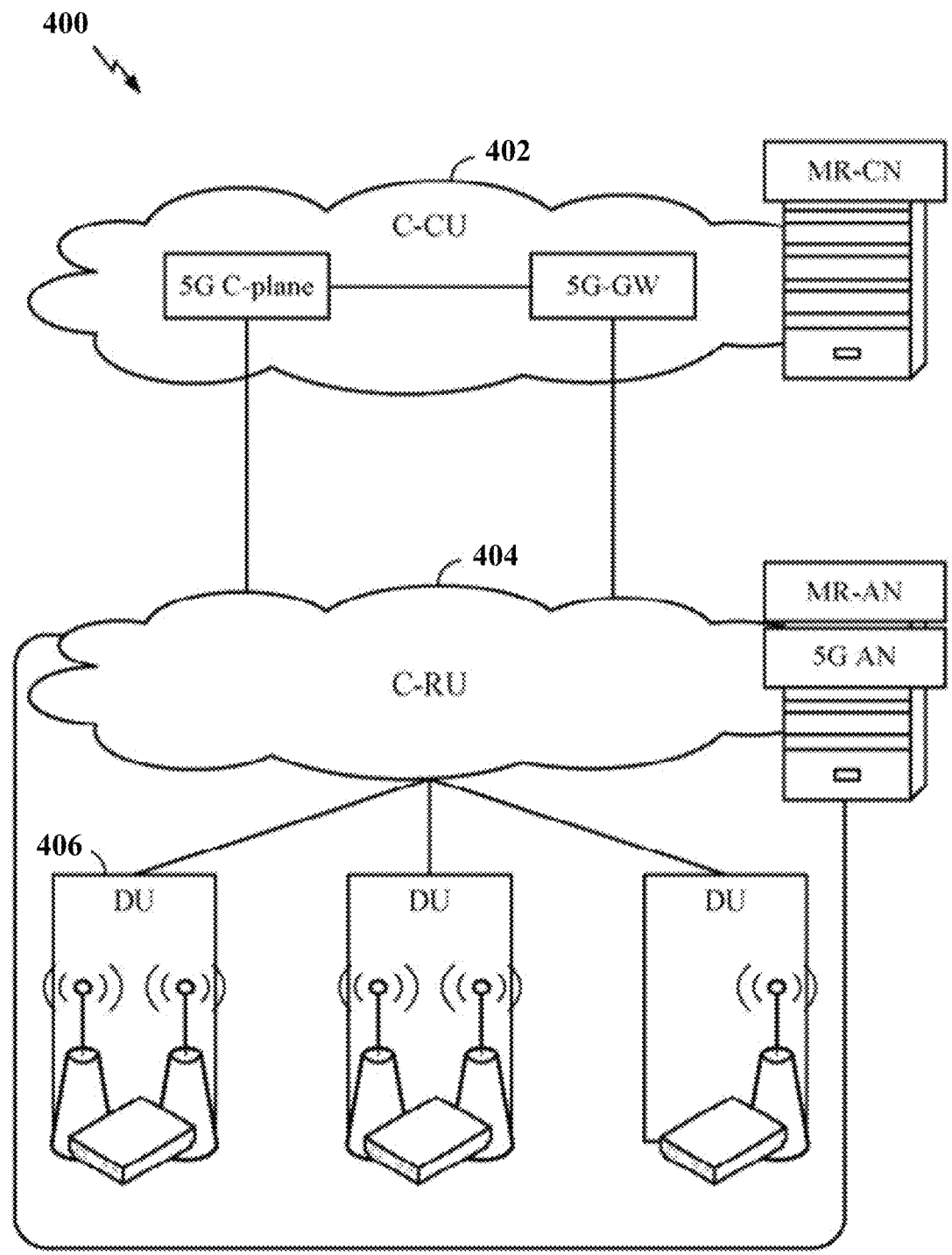
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
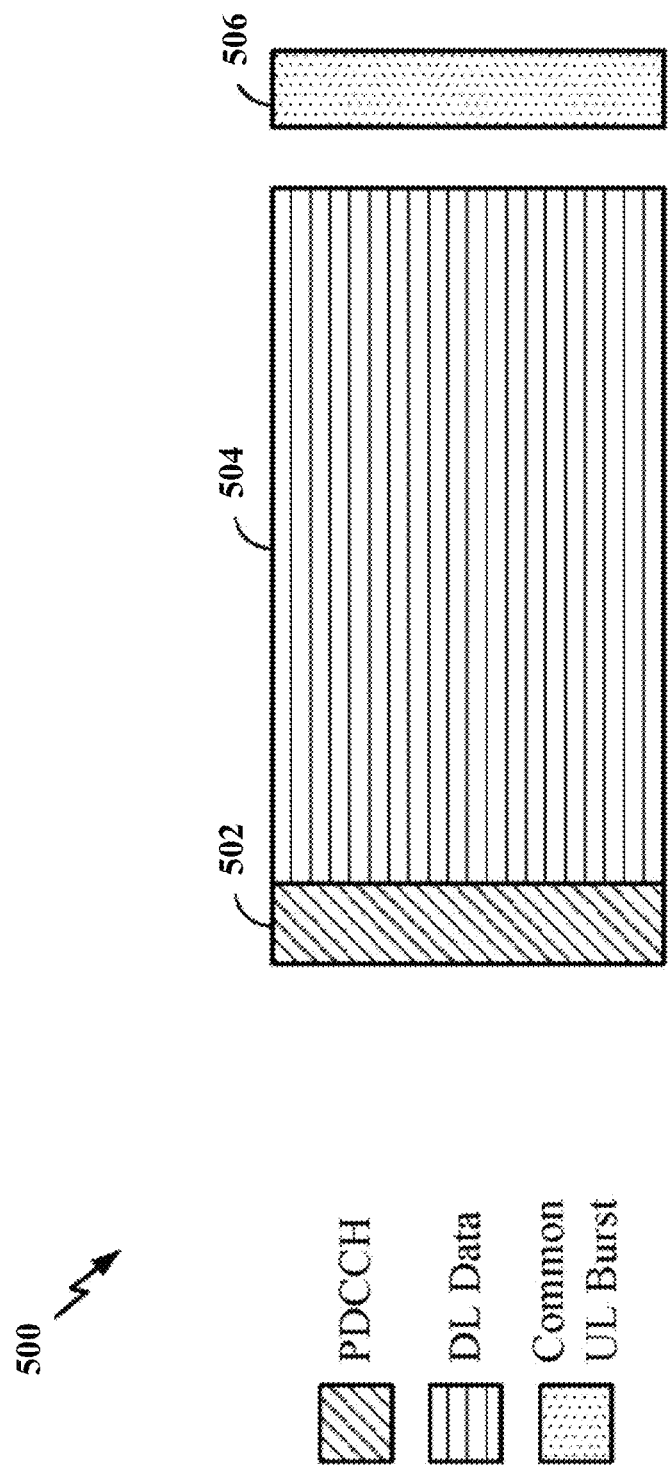
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
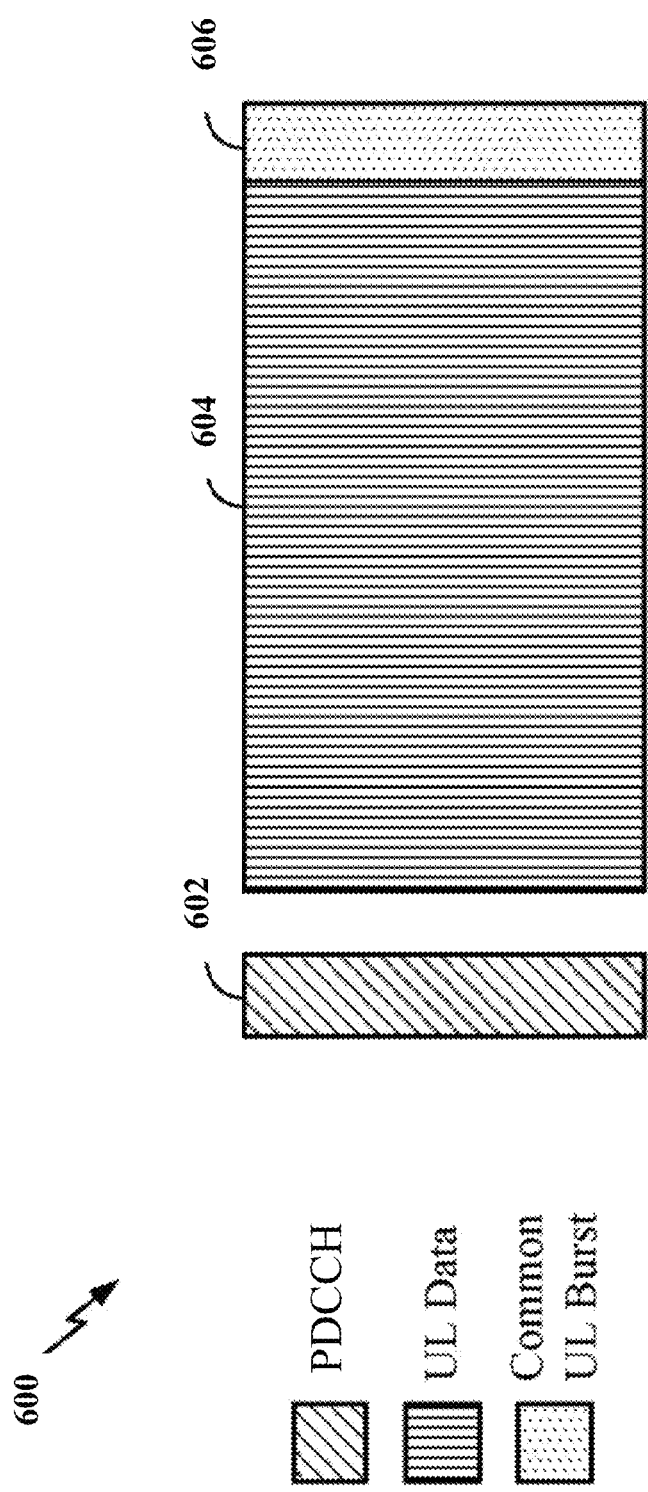
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
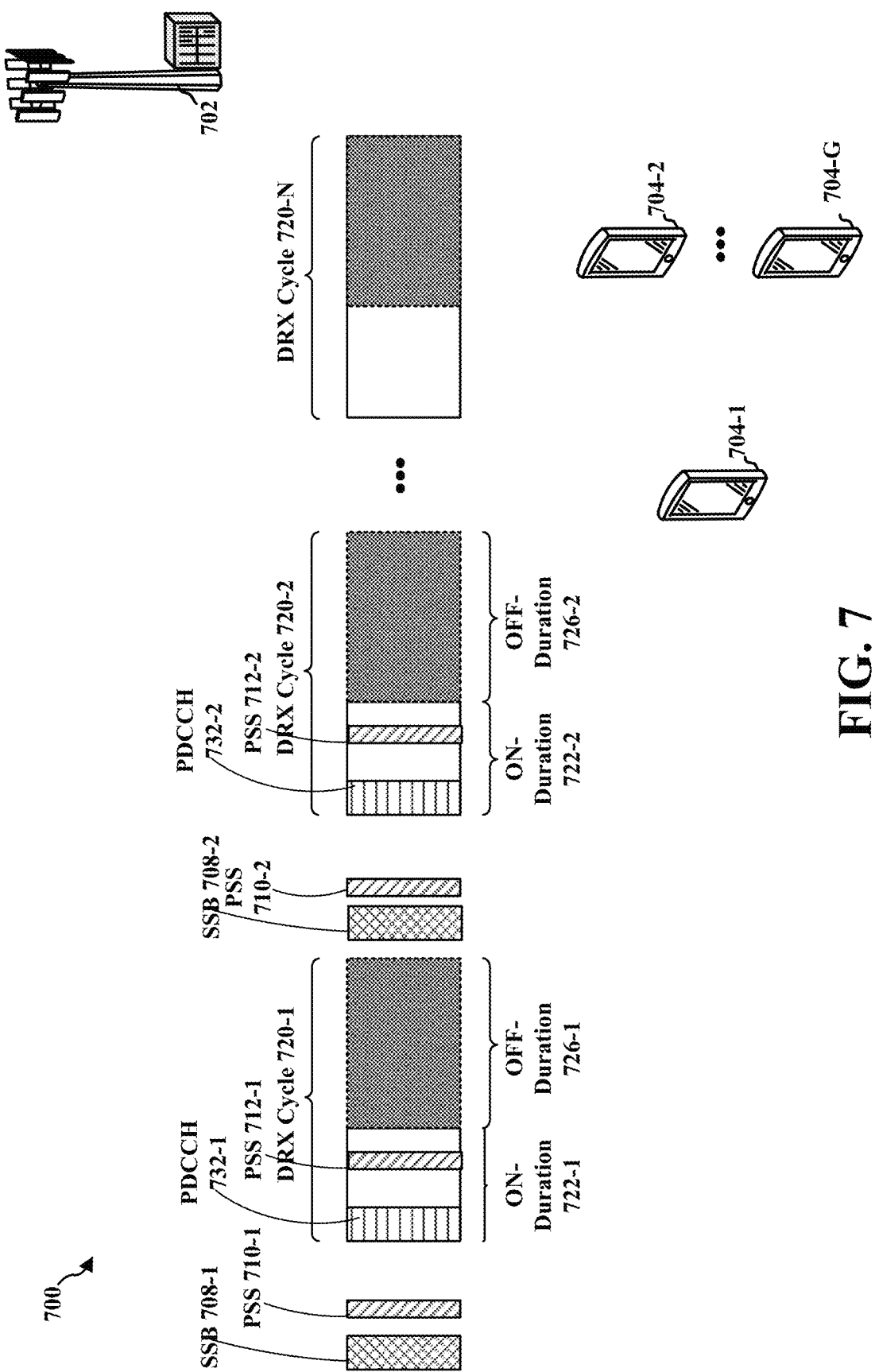
FIG. 7 is a diagram illustrating communications between a base station and UE.

FIG. 7 is a diagram 700 illustrating communications between a base station 702 and a UE 704-1. The UE 704-1 implements a discontinuous reception (DRX) mechanism. The basic mechanism for DRX is a configurable DRX cycle in the UE 704-1. With a DRX cycle configured with an ON duration and an OFF duration, the device monitors the downlink control signaling only when active (i.e., in the ON duration), sleeping with the receiver circuitry switched off the remaining time (i.e., in the OFF duration). This allows for a significant reduction in power consumption: the longer the cycle, the lower the power consumption. Naturally, this implies restrictions to the scheduler as the device can be addressed only when active according to the DRX cycle.

In this example, the UE 704-1 activates the DRX mechanism and operates in accordance with DRX cycles 720-1, 720-2, . . . , 720-N. Each DRX cycle includes an ON duration and an OFF duration. For example, the DRX cycle 720-1 contains an ON duration 722-1 and an OFF duration 726-1; the DRX cycle 720-2 contains an ON duration 722-2 and an OFF duration 726-2 and so on.

Further, the base station 702 may transmit a power saving signal in a set of resource elements at configured locations prior to a corresponding DRX cycle of the UE 704-1. The power saving signal may include an indication of a bandwidth part to which the first UE is to be switched. The power saving signal may include an indication that aperiodic tracking reference signals are to be transmitted. The power saving signal may include an indication that a bandwidth part on a carrier of the first UE is a dormant bandwidth part. The power saving signal may include an indication of a carrier for which the values of the first set of power configuration parameters are to be applied. The power saving signal may include at least one of an indication of the values of the first set of power configuration parameters and a wake-up indication. The wake-up indication may indicate whether there are data directed (addressed) to the UE 704-1 to be transmitted in the ON duration of the corresponding DRX cycle. The wake-up indication may indicate that the first UE stays awake in an ON duration in a DRX cycle subsequent to the Layer 1 signaling. The wake-up indication may indicate that the first UE stays awake in ON durations of a group of consecutive DRX cycles subsequent to the Layer 1 signaling. In this example, the base station 702 transmits a power saving signal 710-1 to the UE 704-1 prior to the DRX cycle 720-1.

In addition, the base station 702 may transmit a power saving signal in a set of resource elements at configured locations within a corresponding DRX cycle of the UE 704-1. In this example, the base station 702 transmits a power saving signal 712-1 to the UE 704-1 in the ON duration 722-1 of the DRX cycle 720-1.

The base station 702 may transmit PDCCH 732-1 and PDCCH 732-2 specific to the UE 704-1 (i.e., UE specific PDCCH) in the ON duration 722-1 and the ON duration 722-2, respectively.

Figure 8:
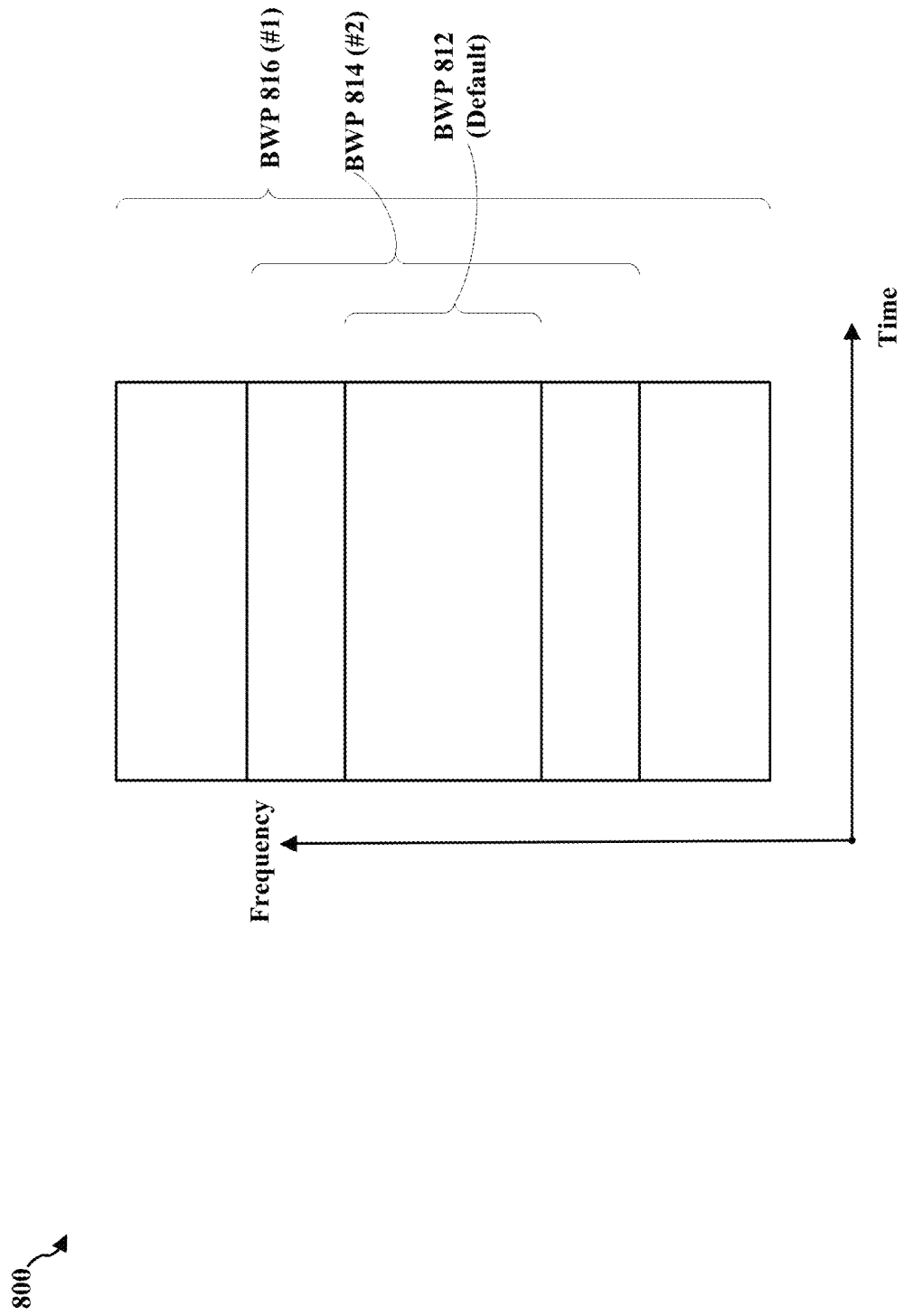
FIG. 8 is a diagram illustrating bandwidth parts utilized by a UE.

FIG. 8 is a diagram 800 illustrating bandwidth parts utilized by a UE. The UE 704-1 may be configured with a default bandwidth part 812, a bandwidth part (#2) 814, and a bandwidth part (#1) 816. The bandwidth part (#1) 816 is larger than the bandwidth part (#2) 814, which is larger than the default bandwidth part 812. Each of the bandwidth parts may be associated with one or more set of power configuration parameters having assigned values. One set of the power configuration parameters is the default set. As described supra, a power saving signal (e.g., the power saving signal 712-1) received by the UE 704-1 may request the UE 704-1 to switch from one bandwidth part to another (e.g., from the bandwidth part (#2) 814 to the bandwidth part (#1) 816). When the power saving signal does not further indicate a particular set of power configuration parameters with particular values for the UE 704-1 to use on the bandwidth part after switch, the UE 704-1 may use the default set of power configuration parameters with particular values associated with that bandwidth part (e.g., the bandwidth part (#1) 816).

The bandwidth part (#1) 816 may be for traffic with large packet size (e.g., greater than or equal to a predetermined size X bits). The bandwidth part (#2) 814 may be for traffic with small packet size (e.g., less than the predetermined size X bits). When there is no data transmission at the UE 704-1, the UE 704-1 operates in the default bandwidth part 812 and enters into a DRX cycle, waiting for power saving signals. Based on the packet size to be transmitted, the power saving signal (e.g., the power saving signal 710-1) may instruct the UE 704-1 to switch to the bandwidth part (#1) 816 when the packet size is large or to switch to the bandwidth part (#2) 814 when the packet size is small.

In another example, at least 2 sets of power configuration parameters with particular values (power-saving configurations) for a bandwidth part can be defined. One set of power configuration parameters with particular values may be for traffic with burst and the other may be for regular and sparse traffic. In this example, the DRX cycle of burst traffic may be shorter than the DRX cycle of sparse traffic.

Further, referring back to FIG. 7, in this example, the power saving signal 710-1 may indicate that the UE 704-1 should monitor the PDCCH 732-1 (which is UE-specific PDCCH) in the upcoming ON duration 722-1. In one configuration, the UE 704-1 enters the ON duration 722-1 using the default set of power configuration parameters with particular values of the bandwidth part for data reception/transmission until the UE 704-1 receives the power saving signal 712-1 indicating a switch of power configuration parameters or values. In another configuration, the UE 704-1 enters the ON duration 722-1 using its current set of power configuration parameters with particular values (default or not) for data reception/transmission until the UE 704-1 receives the power saving signal 712-1 indicating a switch of power configuration parameters or values.

As described supra, in certain configurations, the base station 702 transmits the power saving signal 712-1 to the UE 704-1 within the ON duration 722-1. The power saving signal 712-1 may be a Layer 1 signaling. In particular, the power saving signal 712-1 may include a power configuration message as part of the downlink control information data carried by a PDCCH. The power saving signal 712-1 may employ a legacy DCI format (e.g. DCI Format 1). The power configuration message may be contained in a new field of the format or in a repurposed legacy field. The field carrying the power configuration message may have predetermined N bits. In one example, the power saving signal 712-1 may contain scheduling DCI. In another example, the power saving signal 712-1 may contain non-scheduling DCI. Alternatively, the power saving signal 712-1 may employ a format dedicated for carrying the power configuration message.

As described supra, the power configuration message indicates, among other things, a set of power configuration parameters with particular values to be used by the UE 704-1. The UE 704-1 decodes the PDCCH of the power saving signal 712-1 and locates the power configuration message in the predetermined field, and determines the set of power configuration parameters with particular values according to the power configuration message. The network may determine the set of power configuration parameters with particular values based on the traffic conditions at the UE 704-1. As described supra, the determined set of power configuration parameters with particular values can be promptly sent to the UE 704-1 through the power saving signal 712-1.

In one example, the power configuration message may be a single bit indicating two states: one is a default set of power configuration parameters with particular values; and the other one is non-default. Further, the default set of power configuration parameters with particular values can be for same-slot scheduling, and the non-default set of power configuration parameters with particular values can be for cross-slot scheduling. In another example, the power configuration message may be a single bit that, when toggled, indicates the default set of power configuration parameters with particular values and, otherwise, the non-default set of power configuration parameters with particular values.

In some scenarios, the UE 704-1 may receive more than one power saving signal in an ON duration. The latest power configuration message has higher priority. That is, the UE 704-1 uses the set of power configuration parameters with particular values indicated by the power configuration message.

As described supra, in certain configurations, the base station 702 transmits the power saving signal 710-1 to the UE 704-1 prior to the ON duration 722-1. The power saving signal 710-1 may be a Layer 1 signaling. In particular, the power saving signal 710-1 may include a power configuration message as part of the downlink control information data carried by a PDCCH. The power configuration message may include an indication of a set of power configuration parameters with particular values and/or a wake-up indication. The power configuration parameter indication and the wake-up indication may be bundled together or separate in one or more PDCCHs.

Further, in certain configurations, a power saving signal may be located in resource elements that are immediately prior to the ON duration of a DRX cycle for which an indication of traffic is included in the power saving signal. That is, the power saving signal 710-1 may occupy resource elements that are immediately prior to the ON duration 722-1.

The UE 704-1 monitors the power saving signal 710-1 prior to the ON duration 722-1 or the power saving signal 712-1 during the ON duration 722-1. Accordingly, the UE 704-1 can decide whether to monitor all PDCCHs in the ON duration 722-1 corresponding on-duration or go to sleep in the entire or remaining ON duration 722-1 after receiving the power saving signal 710-1 and the power saving signal 712-1, respectively.

In one example, the UE 704-1 monitors the power saving signals for every on-duration. That is, the UE 704-1 always monitors the power saving signals according to the monitoring occasion(s), as described infra. When the UE 704-1 does not receive a wake-up indication, the UE 704-1 has the opportunity to skip the UE-specific PDCCH (e.g., the PDCCH 732-1) monitoring in the upcoming on-duration (e.g., the ON duration 722-1). The power saving signal may not impact the C-DRX relevant timer in current moment.

In another example, the UE 704-1 only monitors the power saving signals in an on-duration only when the DRX inactivity timer has stopped. The UE 704-1 does decode a power saving signal for power configuration messages when the monitoring occasions of the power saving signal overlaps with DRX Active Time (e.g., inactivity timer runs). That is, the UE 704-1 may choose to decode the power saving signal for power configuration messages only in DRX Inactive Time.

In one configuration, the Layer 1 signaling is group-UE-specific. For example, the UEs 704-1, 704-2, . . . 704-G may be a group and the power saving signal 710-1 may be a PDCCH that is directed to the group of UEs 704-1, 704-2, . . . 704-G.

Figure 9:
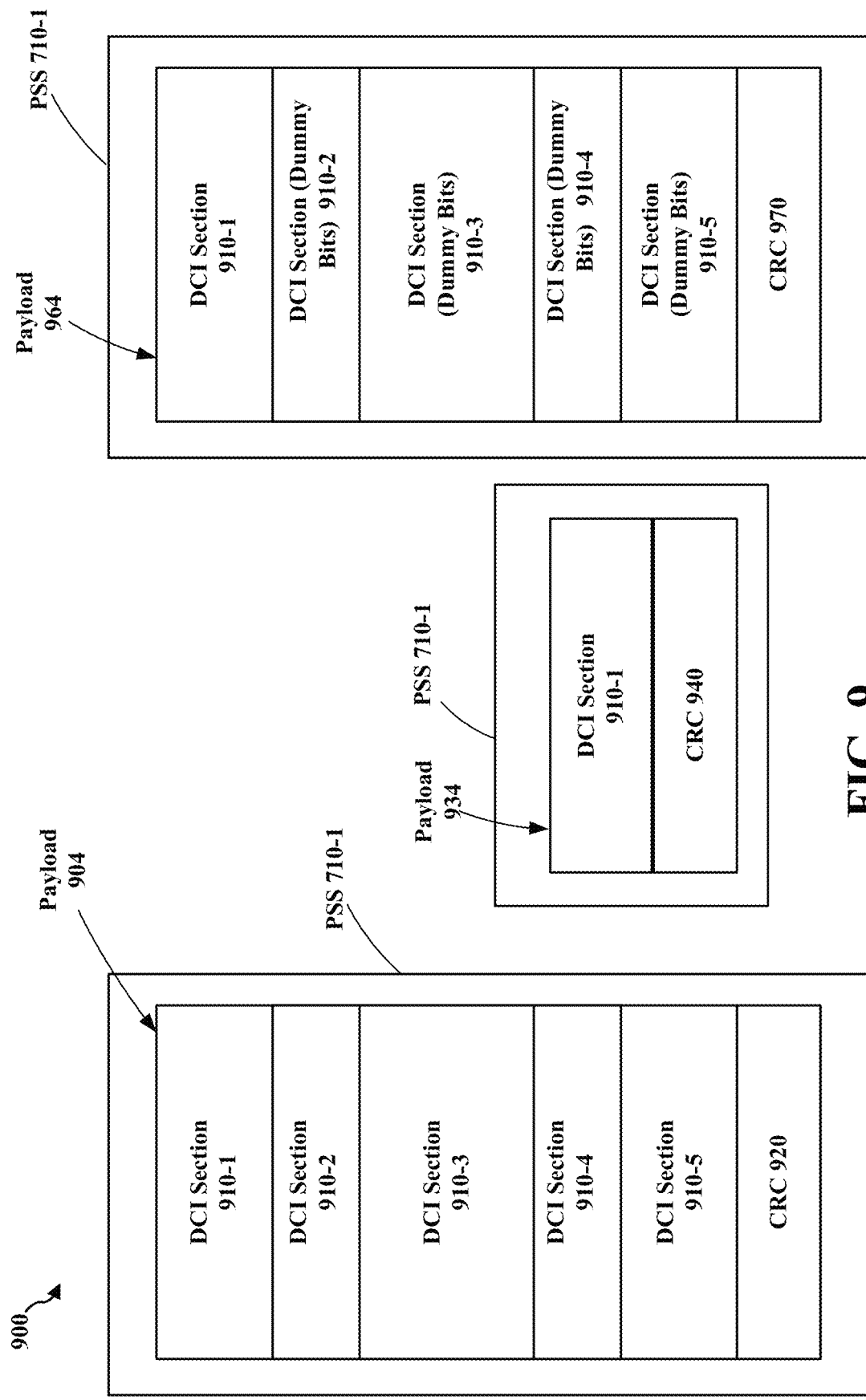
FIG. 9 is a diagram illustrating a payload that may be carried by the power saving signal.

FIG. 9 is a diagram 900 illustrating a PDCCH payload 904 that may be carried by the power saving signal 710-1. In this example, the DCI data in the PDCCH payload 904 are divided into DCI sections 910-1 to 910-5, which are directed to the UEs 704-1 to 704-5, respectively. The PDCCH payload 904 also includes a CRC 920, which is calculated based on bits of the DCI sections 910-1 to 910-5, collectively. The PDCCH payload 904 may be scrambled by a Radio Network Temporary Identifier (RNTI) designated for the power saving signal.

Upon receiving the PDCCH payload 904 carried by the power saving signal 710-1, each of the UEs 704-1 to 704-5 can extract the DCI section directed to that UE from the PDCCH payload 904. From the perspective of network overhead, group-UE-specific PDCCH has some advantages. One the other hand, from the perspective of power saving at each UE, UE-specific PDCCH has some advantages.

In certain configurations, the base station 702 can construct the power saving signal 710-1 as UE-specific or group-UE-specific. The network selects one that is most suitable for current scenario. In one example, at a monitoring occasion, the UE 704-1 monitors both UE-specific and group-UE-specific PDCCHs. In another example, the UE 704-1 may receive a higher layer signaling (e.g., UE-specific RRC signaling) indicating whether the power saving signal 710-1 is UE-specific or group-UE-specific. The UE 704-1 then detects the power saving signal 710-1, accordingly.

In one technique, although the power saving signal 712-1 generally contains the PDCCH payload 904 that is group-UE-specific, the base station 702 may include UE-specific PDCCH payload 934 when it is not easy for the base station 702 to group the UEs or the number of UEs in CONNECTED mode is small (e.g., less than 10, 5, 3, etc.). Therefore, the power saving signal 710-1 contains the PDCCH payload 934 and a CRC 940. At each monitoring occasion, the UE 704-1 decodes the symbols based on both the size of the PDCCH payload 904 and the size of the PDCCH payload 934.

In another technique, the base station 702 can construct a PDCCH payload 964 that is specific to the UE 704-1. The PDCCH payload 964 is similar to the PDCCH payload 904 and has DCI sections 910-1 to 910-5. The DCI section 910-1 contains DCI data for the UE 704-1, while the DCI section 910-2 to DCI section 910-5 only contain dummy bits (e.g., all 0s or all 1s). A CRC 970 is calculated and included in the PDCCH payload 964. The PDCCH payload 904 and the PDCCH payload 964 have the same size. At each monitoring occasion, the UE 704-1 decodes the symbols based on the size of the PDCCH payload 904.

In certain configurations, when none of UEs in a group should be wakened up or switched to a new set of power configuration parameters with particular values in the following on-duration in their DRX-cycle, the base station 702 may choose not to transmit a power saving signal.

As described supra, the UE 704-1 decodes the PDCCH payload 904/PDCCH payload 964 and the PDCCH payload 934 based on the payload sizes. When the UE 704-1 can be configured with additional DCI sizes for monitoring, the DCI size budget is enlarged. That is, the UE 704-1 additionally monitors the sizes of the PDCCH payload 904/PDCCH payload 964 and the PDCCH payload 934.

When the UE 704-1 cannot be configured to monitor the additional sizes of the PDCCH payload 904 and/or the PDCCH payload 964, the sizes of the PDCCH payload 904 and/or the PDCCH payload 964 can be aligned with other existing DCI formats, (e.g., DCI format 1_0). In this case, the UE 704-1 monitors the DCI for the power configuration message (including the wake-up indication and/or the set of power configuration parameters with particular values based on the aligned payload size in a slot.

When UE 704-1 does not detect the power saving signal 710-1 successfully, in one configuration, the UE 704-1 can go to sleep for the entire ON duration 722-1. When the UE 704-1 does not detect the power saving signal 712-1 at the monitoring occasion in the ON duration 722-1 successfully, the UE 704-1 can go to sleep after the monitoring occasion.

In another configuration, when the UE 704-1 does not detect the power saving signal (e.g., power saving signal 710-1 and the power saving signal 712-1) successfully, the UE 704-1 stays awake and monitors all PDCCHs in the on-duration in C-DRX (e.g., the ON duration 722-1).

The power saving signal 710-1 may be transmitted in a Type3-PDCCH common search space configured for the UEs 704-1, 704-2, . . . 704-G. The UE 704-1 monitors the DCI in the common search space when the UE 704-1 is in CONNECTED mode, is enabled for handling a power configuration message, and is configured to monitor the power saving signal in a specific search space. That is, the search space configuration indicates that the DCI should be monitored in a particular search space. Similar to DCI format 2_0, additional aggregation levels and corresponding candidate number can be further configured for this DCI format. In particular, one or two aggregation levels and one or two candidates per aggregation level are configured for the search space. In other words, a search space of the power saving signal 710-1 contains Control-Channel Elements (CCEs) formed at one or two aggregation levels each having one or two candidates.

The size of the PDCCH payload 904 may be configured by UE-specific RRC signaling. The UE 704-1 monitors the PDCCH based on the configured DCI payload size.

The DCI data in the power saving signal for a particular UE may include one or more power configuration commands. For example, the DCI section 910-1 for the UE 704-1 may contain N power configuration commands, N being an integer greater than 0. Each power configuration command may indicate a set of power configuration parameters with particular values for the UE 704-1 to switch to on a particular carrier. In one example, the DCI section 910-1 carries information to the UE 704-1 for one or more cells. That is, one or more power configuration commands can be configured to the UE 704-1 depending on the number of activated carriers. In another example, the DCI section 910-1 carries information to the UE 704-1 only for a primary cell and a secondary cell. The UE 704-1 may receive power configuration command indices indicating a position of the first bit of each power configuration commands. The power configuration command indices can be configured by UE-specific RRC signaling.

As described supra, the power saving signal may include, among other things, a wake-up indication. In a first option, the wake-up indication may be associated with a DRX ON duration that is the closest to the wake-up indication. For example, the ON duration 722-1 is the closest ON duration to the power saving signal 710-1. In a second option, the wake-up indication may be associated with a group of DRX ON durations that are the closest to the wake-up indication. The number of DRX cycles in the group may be pre-configured (e.g., 2, 3, 4, etc.) For example, the ON duration 722-1 and the ON duration 722-2 may considered as a group of ON durations, which is the closest to the power saving signal 710-1.

The power saving signal may include an indication (e.g., an index) of a bandwidth part (e.g., bandwidth part (#1) 816) to which the UE should switch to.

Further, the power saving signal may further indicate existence of an aperiodic tracking reference signals directed to the UE in the ON duration. The power saving signal may include an indication that aperiodic channel state information reference signals (ACSI-RSs) are to be transmitted and an indication that the UE is to transmit a corresponding channel state information (CSI) report. The power saving signal may also include an indication that a bandwidth part on a carrier of the UE is a dormant bandwidth part. The UE does not monitor PDCCHs or receive/transmit corresponding PDSCH/PUSCH in a dormant BWP. The UE may only perform CSI measurement and reporting, As described supra, each of the UEs 704-1, 704-2, . . . 704-G may be configured with a monitoring window for detecting the power saving signal. Each UE may also be assigned one or more monitoring occasions in the monitoring window. The length of the monitoring window may be a predetermined number of time units. The time unit may be a slot, a symbol period, or 1 msec, etc.

The configurations for the monitoring window and the monitoring occasions can be provided to each of the UEs 704-1, 704-2, . . . 704-G by UE-specific RRC signaling. As such, the UEs 704-1, 704-2, . . . 704-G can determine monitoring windows and detect power saving signals based on the configured information. The configuration includes information regarding one or more of: frequency location of monitoring window; length of monitoring window; time location of monitoring window; corresponding on-duration; monitoring occasions for power saving signals in a slot or in a monitoring window (e.g., a bit map); periodicity of monitoring window.

In particular, the time location of monitoring window can be derived based on time-offset relative to associated SSB (or SSB burst) or relative to first slot of relative to 1st slot of corresponding on-duration. For example, the monitoring occasion for the power saving signal 710-1 can be specified by an offset from the synchronization signal block 708-1 or an offset from the first slot in the ON duration 722-1.

If the monitoring window equals a CORESET configured for the UE, the CORESET & search space configurations can be reused for specifying time, frequency and monitoring occasion indications of the monitoring window.

To enlarge the power saving gains, the ramp up/down number may be reduced to increase the chance for light or deep sleep. It makes a monitoring occasion power of a power saving signal be close to an SSB (or SSB burst). This SSB (or SSB burst) is the one that is closest to starting time of the UE's DRX ON duration.

Figure 10:
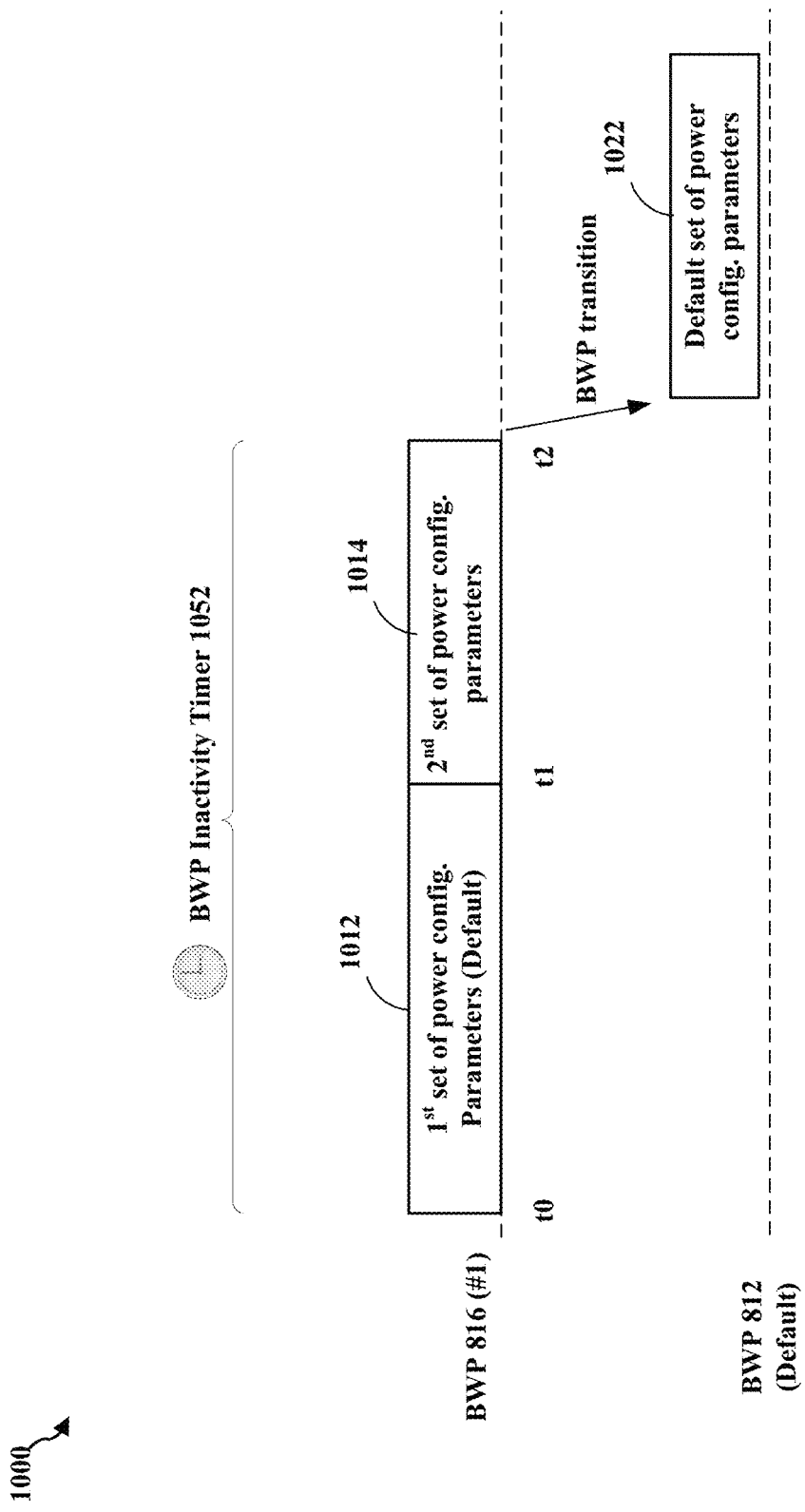
FIG. 10 is a diagram illustrating a timer based power saving mechanism.

FIG. 10 is a diagram 1000 illustrating a timer based power saving mechanism. In this example, at time point t0, the UE 704-1 operates on the bandwidth part (#1) 816 using a set of power configuration parameters with particular values 1012. The set of power configuration parameters with particular values 1012 may be the default set of power configuration parameters with particular values for the bandwidth part (#1) 816. The UE 704-1 just finished a transmission or reception. As such, the UE 704-1 starts a BWP inactivity timer 1052, which has a duration of t2. When the UE 704-1 does not transmit data or receive data between time point t0 and time point t1, the power saving timer 1054 reached at time point t1.

When the BWP inactivity timer 1052 reaches time point t1, the UE 704-1 switches from using the set of power configuration parameters with particular values 1012 to the set of power configuration parameters with particular values 1014, which may constitute a power saving profile. When using the set of power configuration parameters with particular values 1014, the UE 704-1 consumes less power than using the set of power configuration parameters with particular values 1012.

The BWP inactivity timer 1052 restarts when the UE 704-1 successfully decodes a DCI to schedule PDSCH. If the UE 704-1 is using the set of power configuration parameters with particular values 1014 when the BWP inactivity timer 1052 restarts, the UE 704-1 switches to use the set of power configuration parameters with particular values 1012, which is the default set of power configuration parameters with particular values for the bandwidth part (#1) 816. Default set of power configuration parameters with particular values of a bandwidth part fits the traffic characteristic for the bandwidth part.

After the time point t1 (or t1 plus a transition time), the UE 704-1 monitors PDCCHs with the power saving profile until the BWP inactivity timer 1052 expires or resets. When the BWP inactivity timer 1052 expires at time point t2, the UE 704-1 falls back to the default bandwidth part 812. A default set of power configuration parameters with particular values 1022 of the default bandwidth part 812 is used unless the power profile is further switched by the network.

The timer-based power configuration adaptation can be used for profile transition and to reduce the dummy PDCCH monitoring during active time without signaling overhead. In a data burst, the data characteristic is sometimes sporadic. The time interval between two scheduling data is not always zero time unit. In addition, the inactivity timer may be set long. A longer inactivity timer may force a UE to stay in C-DRX active state for a longer duration.

The time-out mechanism and L1 based signaling can be applied jointly or independently for power configuration switching. If a power configuration collision exists, e.g., L1 based signaling and time-out mechanism happen in the same slot, in a first option, power configuration itching through L1 signaling has a higher priority. In a second option, the power configuration related to normal data reception has a priority higher than that of a power saving profile.

Further, in a first technique, the base station 702 may send power saving signals explicitly to the UE 704-1 for a secondary cell. For example, the DCI section 910-1 may carry not only the power configuration message for a primary cell (PCell) but also for a secondary cell (Scell).

In a second technique, the set of power configuration parameters with particular values of the secondary cell is bundled with the set of power configuration parameters with particular values of the primary cell. When the PCell is using a set of power configuration parameters with particular values designated for data traffic, e.g., traffic in a large bandwidth part, traffic having large data reception, the Scell can also switch to a set of power configuration parameters with particular values designated for data traffic (e.g., large bandwidth part).

In other situations, the Scell may continue using the set of power configuration parameters with particular values designated for power saving. The UE 704-1 may not monitor PDCCHs in active state of C-DRX on the SCell when SCell is using the set of power configuration parameters with particular values designated for power saving. Alternatively, the UE 704-1 may monitor PDCCHs with a longer periodicity in active state of C-DRX on the SCell when SCell is using the set of power configuration parameters with particular values designated for power saving.

Figure 11:
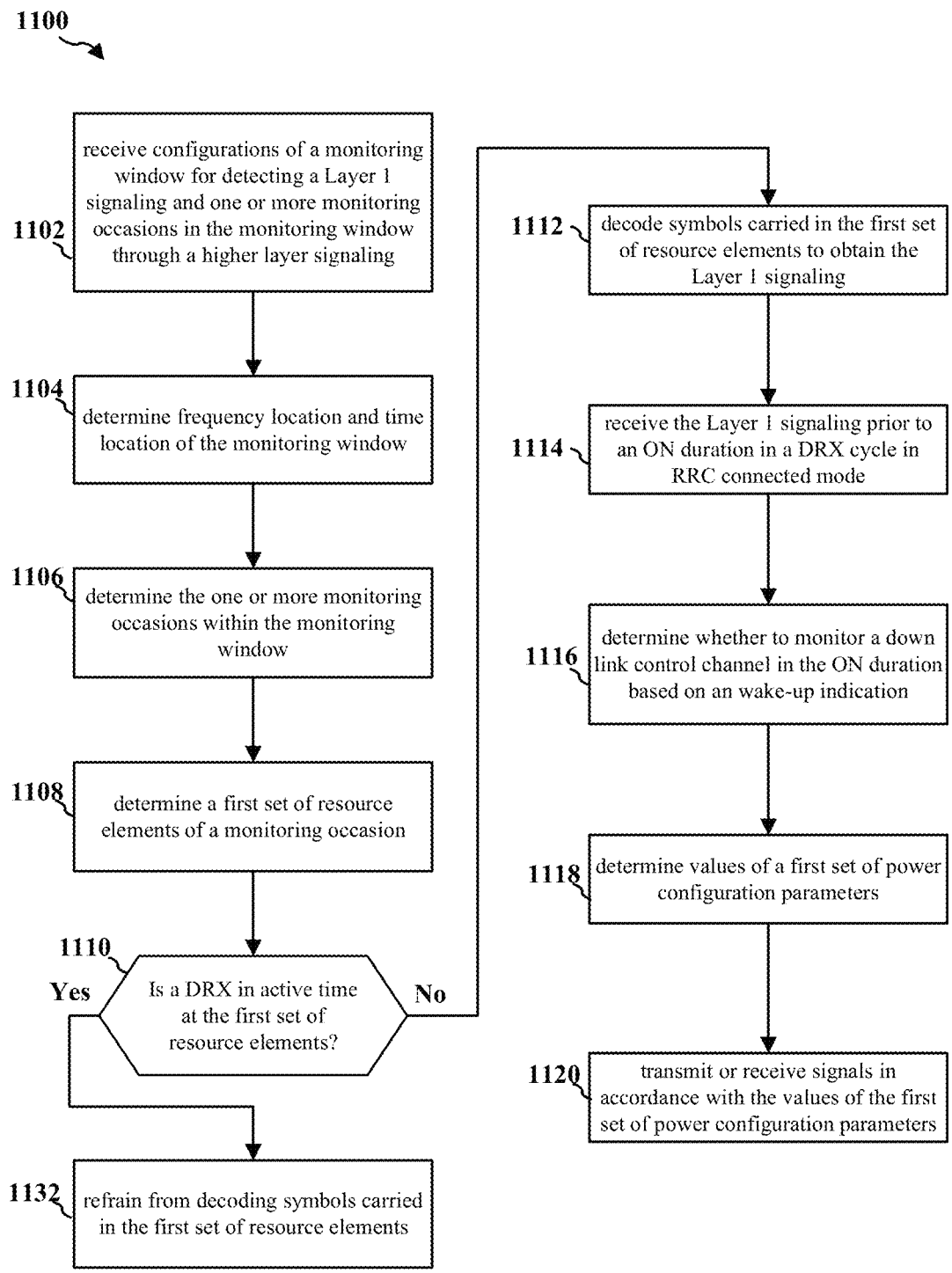
FIG. 11 is a flow chart of a method (process) for performing power saving adaptation.

FIG. 11 is a flow chart 1100 of a method (process) for performing power saving adaptation. The method may be performed by a first UE (e.g., the UE 704-1, the apparatus 1302, and the apparatus 1302').

At operation 1102, the first UE receives configurations of a monitoring window for detecting a Layer 1 signaling and the one or more monitoring occasions in the monitoring window through a higher layer signaling. The configurations indicate at least one of: the frequency location of the monitoring window, the time location of the monitoring window, and a periodicity of the monitoring window. In certain configurations, the time location of the monitoring window is indicated by an offset from a synchronization signal block. In certain configurations, the time location of the monitoring window is indicated by an offset from an initial slot of a corresponding ON duration in a discontinuous reception (DRX) cycle. In certain configurations, the time location of the monitoring window includes a length of the monitoring window indicated as a number of predetermined time units.

At operation 1104, the first UE determines the frequency location and the time location of the monitoring window based on the configurations. At operation 1106, the first UE determines the one or more monitoring occasions within the monitoring window. At operation 1108, the first UE determines a first set of resource elements of a monitoring occasion.

At operation 1110, the first UE determines whether a DRX is in active time at the first set of resource elements. When the DRX is in active time, at operation 1132, the first UE refrains from decoding symbols at the first set of resource elements.

When the DRX is not in active time, at operation 1112, the first UE decodes symbols carried in the first set of resource elements to obtain the Layer 1 signaling. In certain configurations, the symbols carried in the first set of resource elements are decoded based on a Radio Network Temporary Identifier (RNTI) dedicated for power configuration.

At operation 1114, the first UE receives the Layer 1 signaling prior to the ON duration in the DRX cycle in RRC connected mode. In certain configurations, the Layer 1 signaling is detected in an ON duration of a DRX cycle of the UE.

A power configuration message is contained in the Layer 1 signaling. In certain configurations, the power configuration message is contained in first downlink control information data received by the first UE through a down link control channel. In certain configurations, a format of the Layer 1 signaling includes a field used to carry the power configuration message. In certain configurations, the down link control channel is directed to a group of UEs including the first UE. In certain configurations, the down link control channel contains respective, separate downlink control information data directed to each respective one UE of the group of UEs. The first downlink control information data are the respective, separate downlink control information data directed to the first UE. In certain configurations, the down link control channel is directed to the first UE specifically. In certain configurations, the down link control channel is carried in a Type3-PDCCH common search space. In certain configurations, a search space of the down link control channel contains Control-Channel Elements (CCEs) formed at one or two aggregation levels each having one or two candidates.

In certain configurations, a payload of the down link control channel has a predetermined size. In certain configurations, the symbols carried in the first set of resource elements are decoded based on at least one of a first predetermined payload size of a down link control channel directed to a first group of UEs including the first UE and a second predetermined payload size of a second down link control channel directed specifically to the first UE. In certain configurations, the first predetermined payload size or the second first predetermined payload size is the same as a third payload size of a third down link control channel. The first UE determines whether a detected down link control channel of the third payload size carries the power configuration message based on an indication in the detected down link control channel.

In certain configurations, the power configuration message includes an indication of a bandwidth part to which the first UE is to be switched. In certain configurations, the power configuration message includes an indication that aperiodic tracking reference signals are to be transmitted. In certain configurations, the power configuration message includes an indication that channel state information reference signals (CSI-RSs) are to be transmitted and an indication that the first UE is to transmit a corresponding channel state information (CSI) report. In certain configurations, the power configuration message includes an indication of a carrier for which the values of the first set of power configuration parameters are to be applied. In certain configurations, the power configuration message includes an indication of the values of the first set of power configuration parameters. In certain configurations, when the Layer 1 signaling is detected prior to an ON duration of a discontinuous reception (DRX) cycle of the UE, the power configuration message further includes a wake-up indication.

At operation 1116, the first UE determines whether to monitor a down link control channel in the ON duration based on the wake-up indication. In certain configurations, the wake-up indication indicates that the first UE stays awake in the ON duration in a discontinuous reception (DRX) cycle subsequent to the Layer 1 signaling. In certain configurations, the wake-up indication indicates that the first UE stays awake in ON durations of a group of consecutive discontinuous reception (DRX) cycles subsequent to the Layer 1 signaling. In certain configurations, the wake-up indication indicating whether data are to be transmitted to the first UE in the ON duration.

At operation 1118, the first UE determines values of a first set of power configuration parameters. A change in a value of each power configuration parameter in the first set of power configuration parameters affects power consumption of the first UE. At operation 1120, the first UE transmits or receive signals in accordance with the values of the first set of power configuration parameters.

In certain configurations, the first UE is configured to operate in any one of one or more bandwidth parts each associated with a default set of power configuration parameters at default values. In certain configurations, the first UE switches from a first bandwidth part of the one or more bandwidth parts to a second bandwidth part. The first UE transmits or receives signals in accordance with the default values of the respective default set of the second bandwidth part when the trigger event is not detected.

In certain configurations, the Layer 1 signaling is not detected in the monitoring window, the first UE operates in a sleep mode in the ON duration subsequent to the monitoring window. In certain configurations, when the Layer 1 signaling is not detected in the monitoring window, the first UE monitors all down link control channels in an ON duration in a discontinuous reception (DRX) after the monitoring window.

In certain configurations, the first UE determines values of a second set of power configuration parameters for a secondary cell. In certain configurations, the first UE transmits or receives signals on the secondary cell in accordance with the values of the second set of power configuration parameters.

Figure 12:
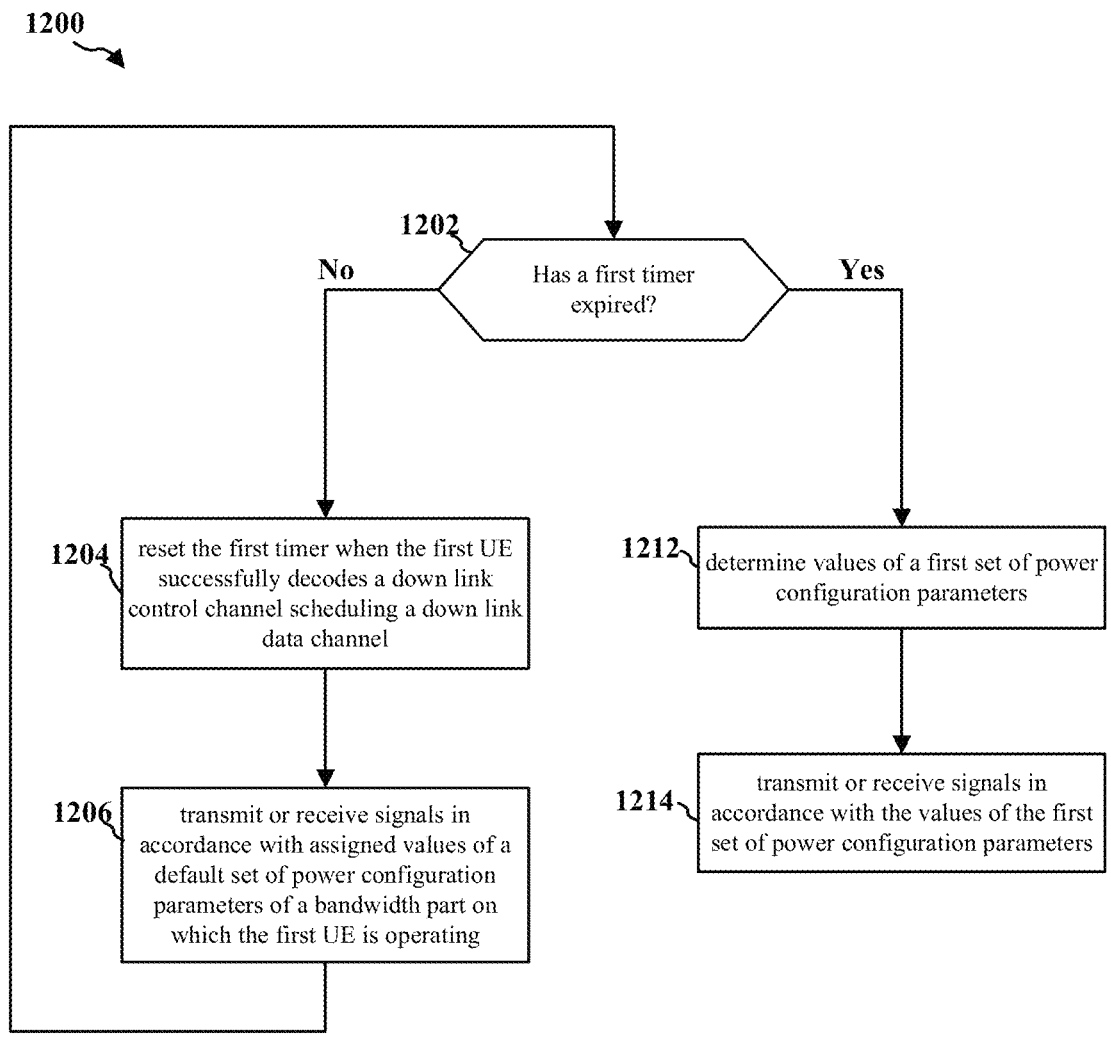
FIG. 12 is a flow chart of another method (process) for performing power saving adaptation.

FIG. 12 is a flow chart 1200 of a method (process) for performing power saving adaptation. The method may be performed by a first UE (e.g., the UE 704-1, the apparatus 1302, and the apparatus 1302'). At operation 1202, the first UE determines whether a first timer has expired. The first timer has a duration shorter than a duration of a bandwidth part inactivity timer. The first UE switches to a default bandwidth part when the bandwidth part inactivity timer expires.

When the first timer has not expired, at operation 1204, the first UE resets the first timer when the first UE successfully decodes a down link control channel scheduling a down link data channel. At operation 1206, the first UE transmits or receives signals in accordance with assigned values of a default set of power configuration parameters of a bandwidth part on which the first UE is operating. Subsequently, the first UE enters operation 1102.

When the first timer has not expired, at operation 1212, the first UE determines values of a first set of power configuration parameters. A change in a value of each power configuration parameter in the first set of power configuration parameters affects power consumption of the first UE. at operation 1214, the first UE transmits or receives signals in accordance with the values of the first set of power configuration parameters.

Figure 13:
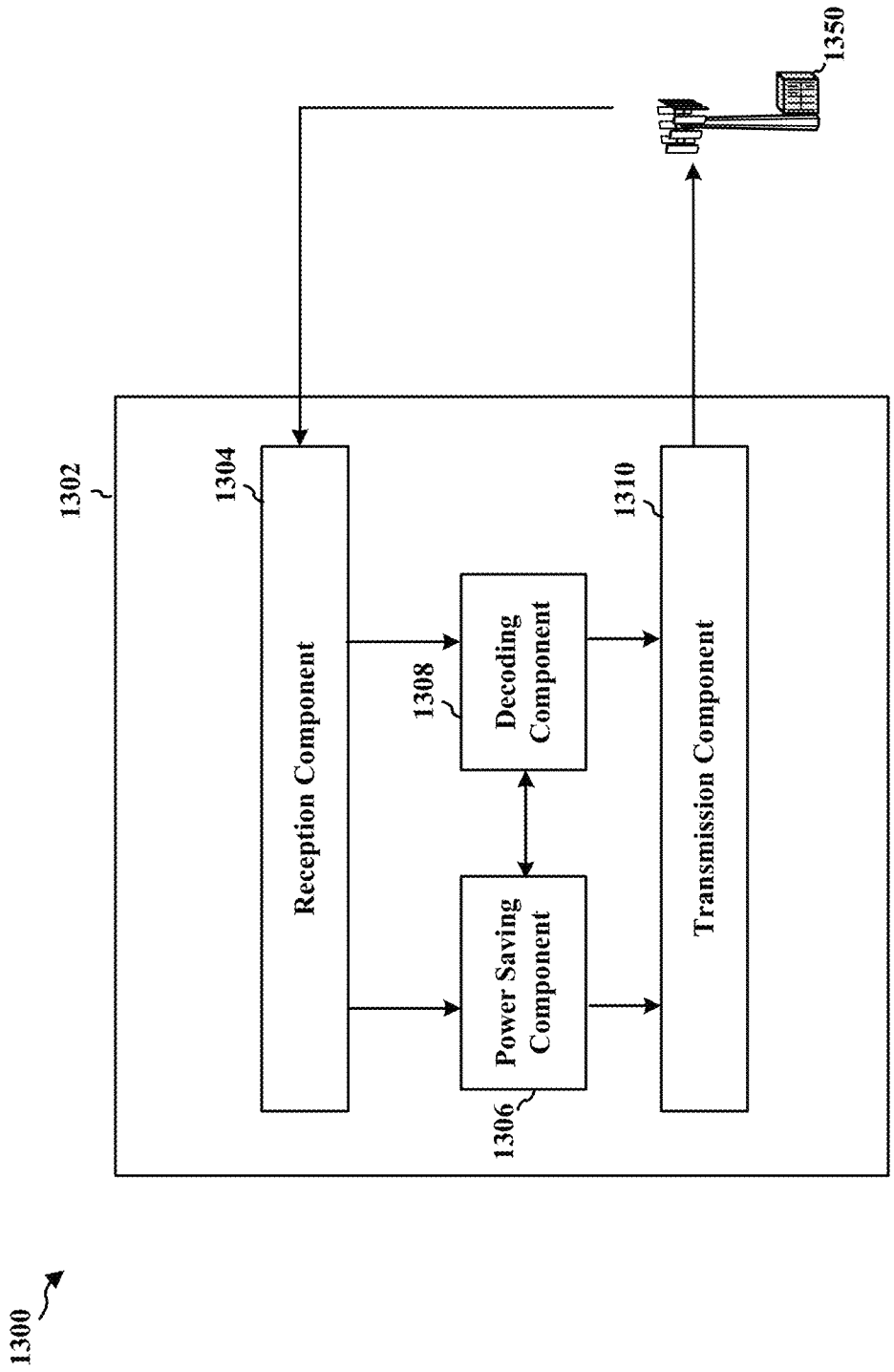
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, a power saving component 1306, a decoding component 1308, and a transmission component 1310.

In one aspect, the power saving component 1306 receives configurations of a monitoring window for detecting a Layer 1 signaling and the one or more monitoring occasions in the monitoring window through a higher layer signaling. The configurations indicate at least one of: the frequency location of the monitoring window, the time location of the monitoring window, and a periodicity of the monitoring window. In certain configurations, the time location of the monitoring window is indicated by an offset from a synchronization signal block. In certain configurations, the time location of the monitoring window is indicated by an offset from an initial slot of a corresponding ON duration in a discontinuous reception (DRX) cycle. In certain configurations, the time location of the monitoring window includes a length of the monitoring window indicated as a number of predetermined time units.

The power saving component 1306 determines the frequency location and the time location of the monitoring window based on the configurations. The power saving component 1306 determines the one or more monitoring occasions within the monitoring window. The power saving component 1306 determines a first set of resource elements of a monitoring occasion.

The power saving component 1306 determines whether a DRX is in active time at the first set of resource elements. When the DRX is in active time, the decoding component 1308 refrains from decoding symbols at the first set of resource elements.

When the DRX is not in active time, the decoding component 1308 decodes symbols carried in the first set of resource elements to obtain the Layer 1 signaling. In certain configurations, the symbols carried in the first set of resource elements are decoded based on a RNTI dedicated for power configuration.

The power saving component 1306 may receive the Layer 1 signaling prior to the ON duration in the DRX cycle in RRC connected mode. In certain configurations, the Layer 1 signaling is detected in an ON duration of a DRX cycle of the UE.

A power configuration message is contained in the Layer 1 signaling. In certain configurations, the power configuration message is contained in first downlink control information data received by the reception component 1304 through a down link control channel. In certain configurations, a format of the Layer 1 signaling includes a field used to carry the power configuration message. In certain configurations, the down link control channel is directed to a group of UEs including the first UE. In certain configurations, the down link control channel contains respective, separate downlink control information data directed to each respective one UE of the group of UEs. The first downlink control information data are the respective, separate downlink control information data directed to the first UE. In certain configurations, the down link control channel is directed to the first UE specifically. In certain configurations, the down link control channel is carried in a Type3-PDCCH common search space. In certain configurations, a search space of the down link control channel contains Control-Channel Elements (CCEs) formed at one or two aggregation levels each having one or two candidates.

In certain configurations, a payload of the down link control channel has a predetermined size. In certain configurations, the symbols carried in the first set of resource elements are decoded based on at least one of a first predetermined payload size of a down link control channel directed to a first group of UEs including the first UE and a second predetermined payload size of a second down link control channel directed specifically to the first UE. In certain configurations, the first predetermined payload size or the second first predetermined payload size is the same as a third payload size of a third down link control channel. The power saving component 1306 determines whether a detected down link control channel of the third payload size carries the power configuration message based on an indication in the detected down link control channel.

In certain configurations, the power configuration message includes an indication of a bandwidth part to which the power saving component 1306 is to be switched. In certain configurations, the power configuration message includes an indication that aperiodic tracking reference signals are to be transmitted. In certain configurations, the power configuration message includes an indication that channel state information reference signals (CSI-RSs) are to be transmitted and an indication that the power saving component 1306 is to transmit a corresponding channel state information (CSI) report. In certain configurations, the power configuration message includes an indication of a carrier for which the values of the first set of power configuration parameters are to be applied. In certain configurations, the power configuration message includes an indication of the values of the first set of power configuration parameters. In certain configurations, when the Layer 1 signaling is detected prior to an ON duration of a discontinuous reception (DRX) cycle of the UE, the power configuration message further includes a wake-up indication.

The power saving component 1306 determines whether to monitor a down link control channel in the ON duration based on the wake-up indication. In certain configurations, the wake-up indication indicates that the first UE stays awake in the ON duration in a discontinuous reception (DRX) cycle subsequent to the Layer 1 signaling. In certain configurations, the wake-up indication indicates that the first UE stays awake in ON durations of a group of consecutive discontinuous reception (DRX) cycles subsequent to the Layer 1 signaling. In certain configurations, the wake-up indication indicating whether data are to be transmitted to the first UE in the ON duration.

The power saving component 1306 determines values of a first set of power configuration parameters. A change in a value of each power configuration parameter in the first set of power configuration parameters affects power consumption of the first UE. The transmission component 1310/reception component 1304 transmits or receive signals in accordance with the values of the first set of power configuration parameters.

In certain configurations, the transmission component 1310/reception component 1304 is configured to operate in any one of one or more bandwidth parts each associated with a default set of power configuration parameters at default values. In certain configurations, the transmission component 1310/reception component 1304 switches from a first bandwidth part of the one or more bandwidth parts to a second bandwidth part. The transmission component 1310/reception component 1304 transmits or receives signals in accordance with the default values of the respective default set of the second bandwidth part when a trigger event is not detected.

In certain configurations, the Layer 1 signaling is not detected in the monitoring window, the transmission component 1310/reception component 1304 operates in a sleep mode in the ON duration subsequent to the monitoring window. In certain configurations, when the Layer 1 signaling is not detected in the monitoring window, the decoding component 1308 monitors all down link control channels in an ON duration in a discontinuous reception (DRX) after the monitoring window.

In certain configurations, the power saving component 1306 determines values of a second set of power configuration parameters for a secondary cell. In certain configurations, the transmission component 1310/reception component 1304 transmits or receives signals on the secondary cell in accordance with the values of the second set of power configuration parameters.

In another aspect, the power saving component 1306 determines whether a first timer has expired. The first timer has a duration shorter than a duration of a bandwidth part inactivity timer. The transmission component 1310/reception component 1304 switches to a default bandwidth part when the bandwidth part inactivity timer expires.

When the first timer has not expired, the power saving component 1306 resets the first timer when the power saving component 1306 successfully decodes a down link control channel scheduling a down link data channel. The transmission component 1310/reception component 1304 transmits or receives signals in accordance with assigned values of a default set of power configuration parameters of a bandwidth part on which the power saving component 1306 is operating.

When the first timer has not expired, the power saving component 1306 determines values of a first set of power configuration parameters. A change in a value of each power configuration parameter in the first set of power configuration parameters affects power consumption of the power saving component 1306. The transmission component 1310/reception component 1304 transmits or receives signals in accordance with the values of the first set of power configuration parameters.

Figure 14:
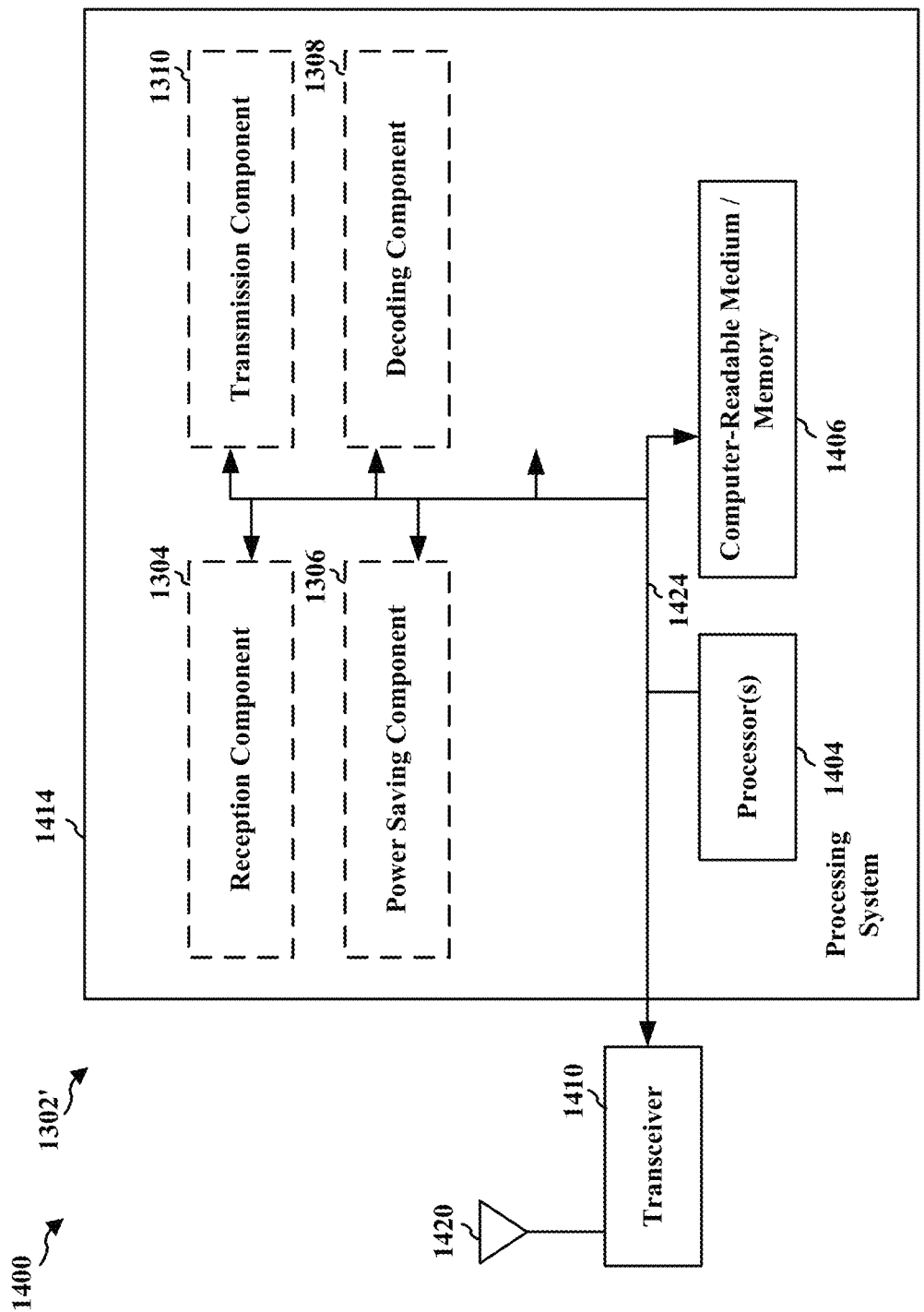
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be a UE. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, the reception component 1304, the power saving component 1306, the decoding component 1308, the transmission component 1310, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 354. The transceiver 1410 is coupled to one or more antennas 1420, which may be the communication antennas 352.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1304, the power saving component 1306, the decoding component 1308, and the transmission component 1310. The components may be software components running in the one or more processors 1404, resident/stored in the computer readable medium/memory 1406, one or more hardware components coupled to the one or more processors 1404, or some combination thereof. The processing system 1414 may be a component of the UE 350 and may include the memory 360 and/or at least one of the TX processor 368, the RX processor 356, and the communication processor 359.

In one configuration, the apparatus 1302/apparatus 1302' for wireless communication includes means for performing each of the operations of FIGS. 11-12. The aforementioned means may be one or more of the aforementioned components of the apparatus 1302 and/or the processing system 1414 of the apparatus 1302' configured to perform the functions recited by the aforementioned means.

As described supra, the processing system 1414 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
   attempting to detect a Layer 1 signaling prior to an ON duration of a discontinuous reception (DRX) cycle of the UE, the Layer 1 signaling carrying a trigger event that is a power configuration message;
   determining values of a first set of power configuration parameters when the trigger event is detected, wherein a change in a value of each power configuration parameter in the first set of power configuration parameters affects power consumption of the first UE; and
   transmitting or receiving signals in accordance with the values of the first set of power configuration parameters.

2. The method of claim 1, wherein the Layer 1 signaling is detected in an ON duration of a discontinuous reception (DRX) cycle of the UE.

3. The method of claim 1, wherein the power configuration message includes an indication of a bandwidth part to which the first UE is to be switched.

4. The method of claim 1, wherein the power configuration message includes an indication that aperiodic tracking reference signals are to be transmitted.

5. The method of claim 1, wherein the power configuration message includes an indication that channel state information reference signals (CSI-RSs) are to be transmitted and an indication that the first UE is to transmit a corresponding channel state information (CSI) report.

6. The method of claim 1, wherein the power configuration message includes an indication of a carrier for which the values of the first set of power configuration parameters are to be applied.

7. The method of claim 1, wherein the power configuration message includes an indication of the values of the first set of power configuration parameters.

8. The method of claim 7, wherein when the Layer 1 signaling is detected prior to an ON duration of a discontinuous reception (DRX) cycle of the UE, the power configuration message further includes a wake-up indication.

9. The method of claim 8, wherein the wake-up indication indicates that the first UE stays awake in the ON duration in a discontinuous reception (DRX) cycle subsequent to the Layer 1 signaling.

10. The method of claim 8, wherein the wake-up indication indicates that the first UE stays awake in ON durations of a group of consecutive discontinuous reception (DRX) cycles subsequent to the Layer 1 signaling.

11. The method of claim 1, wherein the power configuration message is contained in first downlink control information data received by the first UE through a down link control channel.

12. The method of claim 11, wherein a format of the Layer 1 signaling includes a field used to carry the power configuration message.

13. The method of claim 11, wherein the down link control channel is directed to a group of UEs including the first UE.

14. The method of claim 13, wherein the down link control channel contains respective, separate downlink control information data directed to each respective one UE of the group of UEs, wherein the first downlink control information data are the respective, separate downlink control information data directed to the first UE.

15. The method of claim 11, wherein the down link control channel is directed to the first UE specifically.

16. The method of claim 11, wherein the down link control channel is carried in a Type3-PDCCH common search space.

17. The method of claim 11, wherein a search space of the down link control channel contains Control-Channel Elements (CCEs) formed at one or two aggregation levels each having one or two candidates.

18. The method of claim 11, wherein a payload of the down link control channel has a predetermined size.

19. The method of claim 1, wherein the first UE is configured to operate in any one of one or more bandwidth parts each associated with a default set of power configuration parameters at default values.

20. The method of claim 19, further comprising:
   switching from a first bandwidth part of the one or more bandwidth parts to a second bandwidth part; and
   transmitting or receiving signals in accordance with the default values of the respective default set of the second bandwidth part when the trigger event is not detected.

21. The method of claim 1, further comprising
   receiving the Layer 1 signaling prior to an ON duration in a discontinuous reception (DRX) cycle in Radio Resource Control (RRC) connected mode, wherein the power configuration message contained in the Layer 1 signaling includes a wake-up indication indicating whether data are to be transmitted to the first UE in the ON duration.

22. The method of claim 21, further comprising
   determining whether to monitor a down link control channel in the ON duration based on the wake-up indication.

23. The method of claim 1, wherein the attempting to detect the Layer 1 signaling includes:
   determining a first set of resource elements allocated for the Layer 1 signaling; and
   decoding symbols carried in the first set of resource elements to obtain the Layer 1 signaling.

24. The method of claim 23, wherein the symbols carried in the first set of resource elements are decoded based on a Radio Network Temporary Identifier (RNTI) dedicated for power configuration.

25. The method of claim 23, wherein the symbols carried in the first set of resource elements are decoded based on at least one of a first predetermined payload size of a down link control channel directed to a first group of UEs including the first UE and a second predetermined payload size of a second down link control channel directed specifically to the first UE.

26. The method of claim 25, wherein the first predetermined payload size or the second first predetermined payload size is the same as a third payload size of a third down link control channel, the method further comprising:
   determining whether a detected down link control channel of the third payload size carries the power configuration message based on an indication in the detected down link control channel.

27. The method of claim 23, further comprising:
   determining whether a discontinuous reception (DRX) is in active time at the first set of resource elements, wherein the decoding the symbols is performed when the DRX is not in active time; and
   refraining from decoding the symbols when the DRX is in active time.

28. The method of claim 23, further comprising:
   determining frequency location and time location of a monitoring window for detecting the Layer 1 signaling; and determining one or more monitoring occasions within the monitoring window, wherein the first set of resource elements constitutes one of the one or more monitoring occasions, wherein the attempting to detect the Layer 1 signaling includes decoding symbols at the one or more monitoring occasions.

29. The method of claim 28, wherein the time location of the monitoring window is determined to be prior to an ON duration in a discontinuous reception (DRX), the method further comprising:
when the Layer 1 signaling is not detected in the monitoring window, operating the first UE in a sleep mode in the ON duration subsequent to the monitoring window.

30. The method of claim 28, the method further comprising:
when the Layer 1 signaling is not detected in the monitoring window, operating the first UE to monitor all down link control channels in an ON duration in a discontinuous reception (DRX) after the monitoring window.

31. The method of claim 28, further comprising:
receiving configurations of the monitoring window and the one or more monitoring occasions through a higher layer signaling, wherein the monitoring window and the one or more monitoring occasions are determined based on the configurations, wherein the configurations indicate at least one of:
the frequency location of the monitoring window;
the time location of the monitoring window; and
a periodicity of the monitoring window.

32. The method of claim 31, further comprising:
wherein the time location of the monitoring window is indicated by an offset from a synchronization signal block.

33. The method of claim 31, further comprising:
wherein the time location of the monitoring window is indicated by an offset from an initial slot of a corresponding ON duration in a discontinuous reception (DRX) cycle.

34. The method of claim 31, further comprising:
wherein the time location of the monitoring window includes a length of the monitoring window indicated as a number of predetermined time units.

35. The method of claim 1, wherein the another trigger event is that a first timer has expired, wherein the first timer has a duration shorter than a duration of a bandwidth part inactivity timer, wherein the first UE switches to a default bandwidth part when the bandwidth part inactivity timer expires.

36. The method of claim 35, further comprising:
prior to the another trigger event, transmitting or receiving signals in accordance with assigned values of second set of power configuration parameters.

37. The method of claim 35, further comprising:
resetting the first timer when the first UE successfully decodes a down link control channel scheduling a down link data channel; and
transmitting or receiving signals in accordance with assigned values of a default set of power configuration parameters of a bandwidth part on which the first UE is operating.

38. The method of claim 1, wherein the first set of power configuration parameters is for a primary cell, the method further comprising:
determining values of a second set of power configuration parameters for a secondary cell; and
transmitting or receiving signals on the secondary cell in accordance with the values of the second set of power configuration parameters.

39. An apparatus for wireless communication, the apparatus being a user equipment (UE), comprising:
a memory; and
at least one processor coupled to the memory and configured to:
attempt to detect a Layer 1 signaling prior to an ON duration of a discontinuous reception (DRX) cycle of the UE, the Layer 1 signaling carrying a trigger event that is a power configuration message;
determine values of a first set of power configuration parameters when the trigger event is detected, wherein a change in a value of each power configuration parameter in the first set of power configuration parameters affects power consumption of the first UE; and
transmit or receive signals in accordance with the values of the first set of power configuration parameters.

40. A non-transitory computer-readable medium storing computer executable code for wireless communication of a user equipment (UE), comprising code to:
attempt to detect a Layer 1 signaling prior to an ON duration of a discontinuous reception (DRX) cycle of the UE, the Layer 1 signaling carrying a trigger event that is a power configuration message;
determine values of a first set of power configuration parameters when the trigger event is detected, wherein a change in a value of each power configuration parameter in the first set of power configuration parameters affects power consumption of the first UE; and
transmit or receive signals in accordance with the values of the first set of power configuration parameters.

* * * * *